United States Patent
Meyer et al.

(10) Patent No.: US 7,680,692 B2
(45) Date of Patent: Mar. 16, 2010

(54) METHOD AND APPARATUS FOR ACCESSING AND STORING DIGITAL IMAGES

(75) Inventors: John F. Meyer, San Diego, CA (US); Steven Y. Kim, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1960 days.

(21) Appl. No.: 09/785,969

(22) Filed: Feb. 17, 2001

(65) Prior Publication Data

US 2002/0116278 A1     Aug. 22, 2002

(51) Int. Cl.
*G06Q 30/00*     (2006.01)

(52) U.S. Cl. .......................................... 705/26

(58) Field of Classification Search ................. 705/26, 705/16, 27; 725/91; 345/345, 357; 709/200, 709/226, 250; 343/233
See application file for complete search history.

(56) References Cited

U.S. PATENT DOCUMENTS

| | | | |
|---|---|---|---|
| 6,456,391 B1 * | 9/2002 | Miyamoto et al. | 358/1.18 |
| 6,715,003 B1 * | 3/2004 | Safai | 710/33 |
| 6,836,617 B1 * | 12/2004 | Parulski | 396/6 |
| 6,956,666 B2 * | 10/2005 | Tanaka | 358/1.15 |
| 7,154,630 B1 * | 12/2006 | Nimura et al. | 358/1.18 |
| 2001/0036324 A1 * | 11/2001 | Altman | 382/305 |

* cited by examiner

*Primary Examiner*—Ronald Laneau

(57) ABSTRACT

A point-of-sale machine accesses digital images stored in memory of a digital camera or other imaging device, and performs a point-of-sale transaction for storing at least one of the digital images at a remote site.

32 Claims, 3 Drawing Sheets

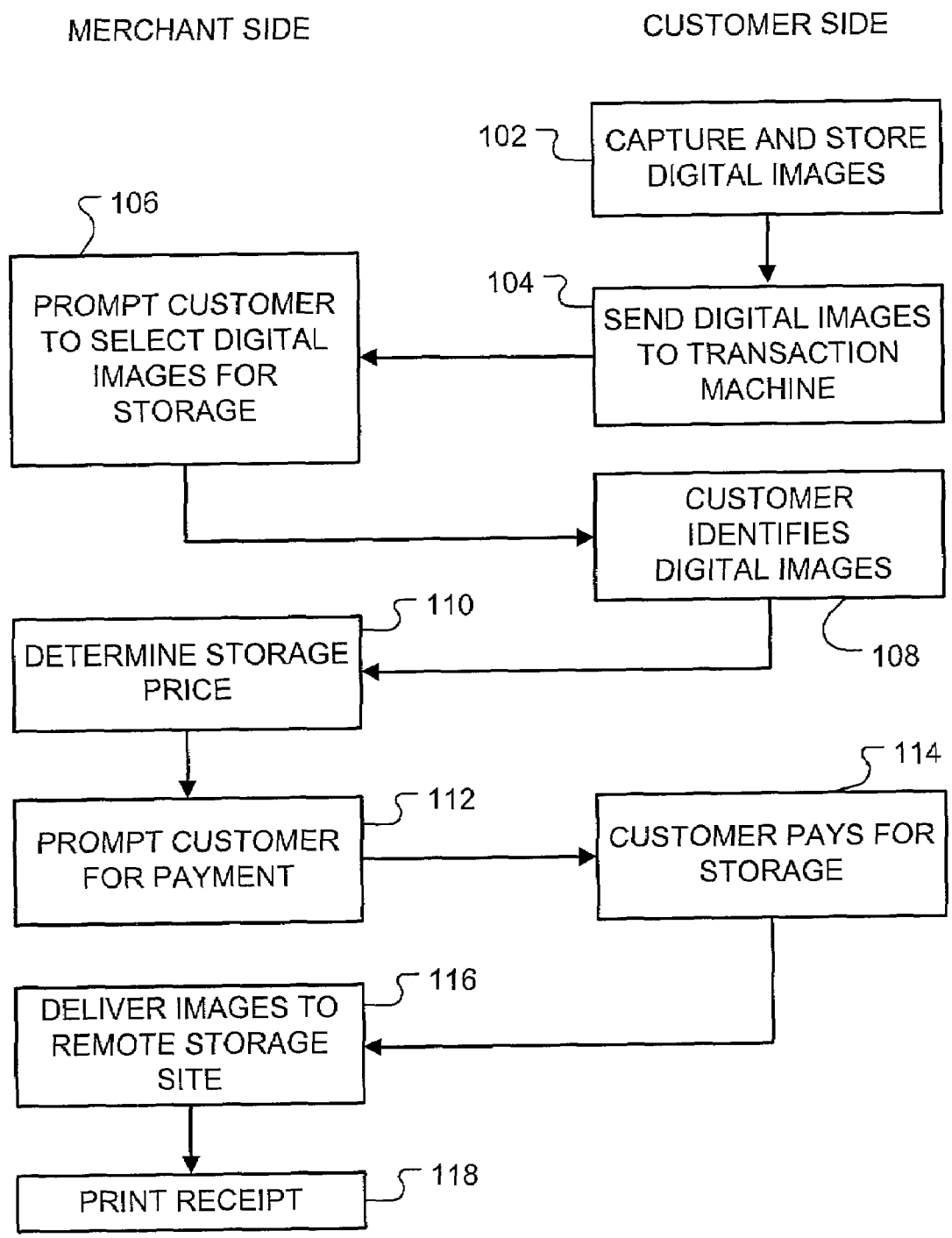

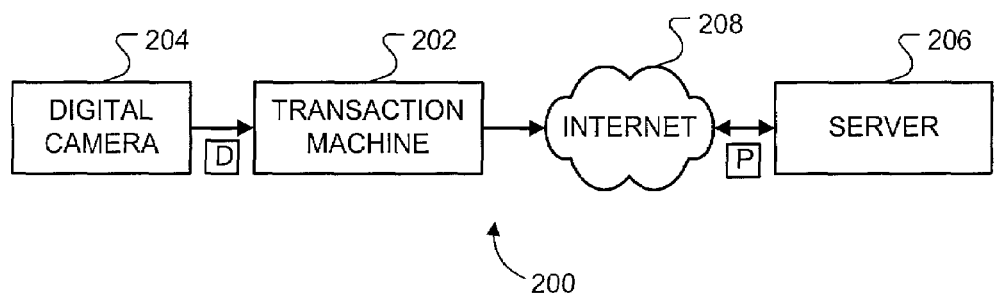
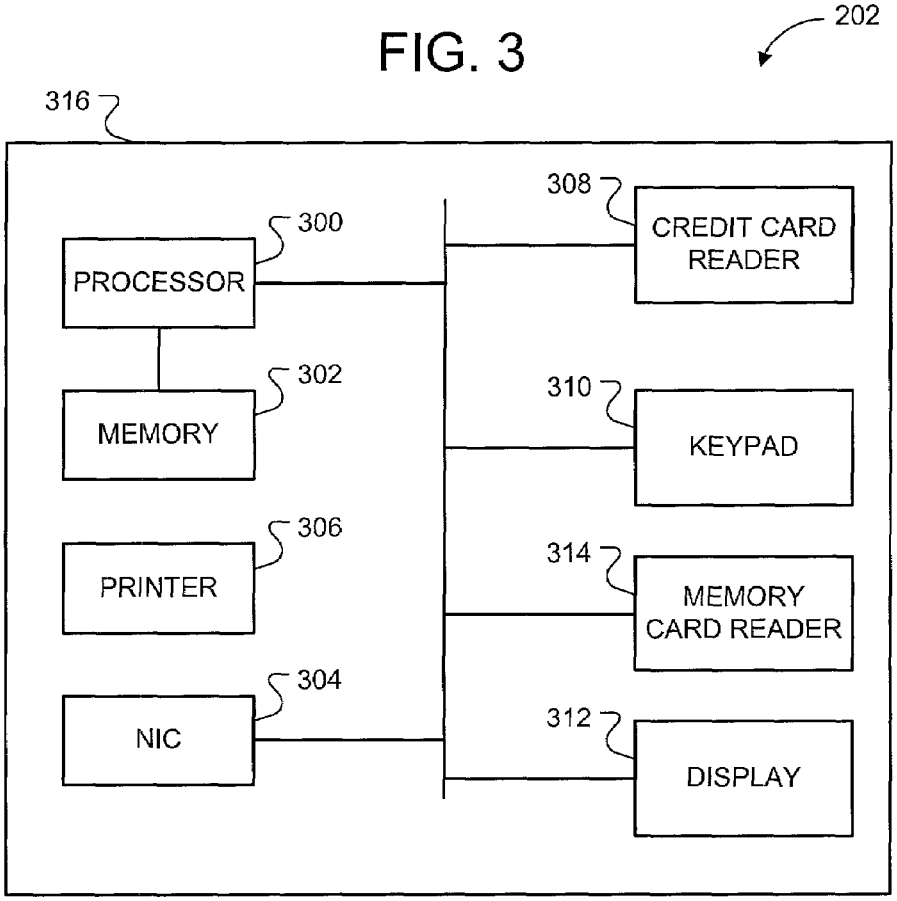

METHOD AND APPARATUS FOR ACCESSING AND STORING DIGITAL IMAGES

BACKGROUND OF THE INVENTION

Digital Cameras are starting to appear in mainstream consumer households. Approximately five percent of US households are creating digital photos with digital cameras. In the year 2000 approximately 6.7 million digital cameras were projected to be sold in the United States, a growth of 103% over 1999, and this trend appears to be continuing. The installed base of digital cameras is estimated to grow from six million in 1999 to 81 million in 2005.

The digital cameras are usually equipped with memory for storing captured digital images. In high-end cameras the memory is removable.

The removable memory provided with high-end digital cameras has a relatively small storage capacity, typically storing only about 10+ high-resolution images. Therefore, extra memory is usually carried for extended photo-taking. However, carrying the extra memory can be is inconvenient. Moreover, the digital images can be lost if the memory removed from the camera is lost or damaged.

Identifying the stored images in memory removed from a digital camera can result in confusion and inconvenience. Unless the memory is labeled, the stored images are not readily identifiable. Usually, the memory is inserted back into the camera in order to identify the images that have been stored.

Memory having high storage capacity may be used in the digital cameras. However, such memory tends to be expensive, and its capacity is still inadequate for extended phototaking.

After the memory has been filled, the digital images are transferred to a storage device such as a desktop computer. Once the images have been transferred, the memory is erased, thereby freeing up the memory for storing additional images.

Many of these images are taken at home, but a significant number of images are taken on family vacations, business trips, visits to theme parks, sightseeings, celebrations, weddings, etc. For many of these photo occasions, the user is away from home and does not have access to a desktop computer to save the images.

A user could take along a portable computer, as inconvenient as it might be. Still, many people would not consider taking a notebook computer to an amusement park. A user could purchase high-capacity memory, but that would be expensive. A user could carry extra memory, but at the risk of losing the images.

There is a need to increase the photo-taking capability of digital cameras without purchasing expensive high-capacity memory, carrying additional memory or lugging around a notebook computer. There is also a need to identify the stored images in memory removed from a digital camera, without having to insert the memory back in the digital camera.

SUMMARY OF THE INVENTION

According to one aspect of the present invention, at least one digital image is received from memory of an imaging device; and a point-of-sale transaction for storing at least one digital image at a remote site is performed. Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is a flowchart of a method of storing digital images at a remote site.

FIG. 2 is an illustration of a system for carrying out the method shown in FIG. 1.

FIG. 3 is an illustration of an exemplary transaction machine for the system shown in FIG. 2.

DETAILED DESCRIPTION OF THE INVENTION

Figure 4:
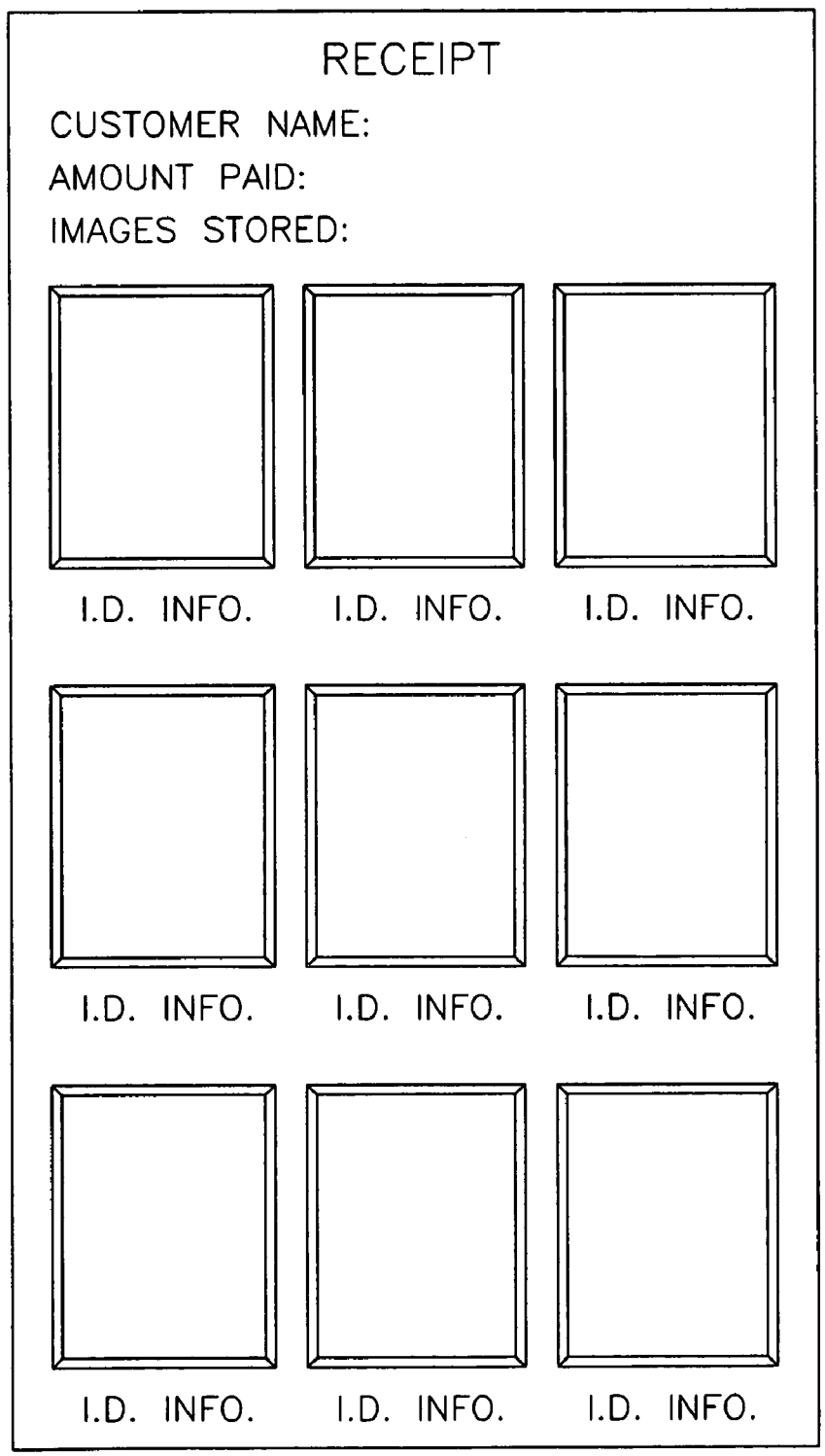
FIG. 4 is an illustration of an exemplary printed-out receipt from a transaction machine, according to an embodiment of this invention.

As shown in the drawings for purposes of illustration, the present invention is embodied in a method of sending digital images from a digital camera to a remote storage site. This service is performed for a fee by a merchant. Once the digital images have been stored at the remote site, camera memory may be erased and used for capturing additional images. As a result, photo-taking capability is increased without carrying additional memory, purchasing expensive high-capacity memory, or having access to a storage device such as a personal or notebook computer.

Reference is now made to FIG. 1, which shows a method of storing digital images at a remote site. Digital images are captured by a digital camera and stored in non-volatile camera memory (block 102). The camera includes a data communications interface that allows the captured images to be uploaded to the Internet, printers, computers and other devices. Typical data communication interfaces for digital cameras include USB interfaces, Firewire (IEEE 1394) interfaces, parallel transfer interfaces, and IrDA interfaces (for wireless transfer). In a typical high-end camera, the non-volatile camera memory is removable. Popular types of removable memory include, but are not limited to, "Memory Sticks," "Smart Cards" and "Compact Flashcards."

A customer sends the digital images to a transaction machine of a merchant (block 104). The digital images may be transmitted via the camera's communication interface, or the digital images may be transmitted by removing the camera memory and inserting the camera memory into a memory reader of the transaction machine.

The transaction machine performs a point-of-sale transaction for storing at least one digital image at a remote site (blocks 106-114). The transaction machine displays a listing of the digital images that have been received and prompts the customer to identify the digital images that the customer wants to store (block 106).

The customer selects the digital images for storage (block 108). For example, the customer could make this selection prior to sending the digital images to the transaction machine, or the selection could be made interactively, with the transaction machine displaying the images and the customer selecting the images to be stored.

Once the digital images have been selected, the transaction machine determines and displays a transaction price for storing the digital images (block 110) and prompts the customer for payment (block 112). The customer pays the merchant for storing the images (block 114). Payment could be made in any acceptable form. For example, the customer could pay by cash, credit card or charge a credit account. If payment is made with a credit card, the transaction machine can also verify the payment information.

After the point-of-sale transaction has been completed, the digital images are delivered to the remote storage site (block 116). The digital images may be delivered in a variety of ways. For example, the digital images may be stored on a recordable medium (e.g., a CD ROM) and mailed to the remote site. If the transaction machine is connected to the remote site via a network, the paid-for images may be uploaded to the remote site. The remote site can reply with a confirmation that the images have been received.

The transaction machine can also print out a receipt for the point-of-sale transaction (block 118). The receipt may provide identifying information about the digital images that were paid for. For example, the receipt may provide a list of the images and a code number for each of the listed images. The code number would make it easier and more secure for the customer to access the stored images from the remote site.

If the customer sent the digital images to the transaction machine via the removable memory, the customer removes the memory card from the transaction machine and re-inserts the removable memory card back into the digital camera. The customer can then erase the digital images in the removable memory and take additional pictures.

For instance, the customer uses a digital camera to take pictures at an amusement park. Once the camera memory becomes full, the customer removes the memory from the camera and gives the camera memory to a merchant at a kiosk. The merchant inserts the camera memory into a transaction machine, and the transaction machine conducts a point-of-sale transaction for storing the digital images at an image storage web site. After the point-of-sale transaction is completed, the transaction machine uploads the paid-for digital images to the web site via the Internet. The customer loads the memory back into the digital camera, erases the memory and continues taking additional pictures. After returning home, the customer logs onto the image storage web site via a personal computer and downloads the images.

FIG. 2 shows an exemplary system 200 for carrying out the method of FIG. 1. A transaction machine 202 receives digital images (D) from the digital camera 204, completes the point-of-sale transaction, and uploads the paid-for digital images (P) to a server 206 or other remote site via the Internet 208. For example, the remote site might be a mail server (in which case the digital images are sent via e-mail), a server that accesses the personal web page of the customer, or a server that accesses the web site of an on-line service provider.

The on-line service provider might provide a service such photo sharing. The photo sharing allows users to share their images with others and reduce storage loads on their personal computers. The images can be accessed online by the user and others. Security for the customer is usually provided as part of the image storage service. See, for example, www.cartogra.com (a photo-sharing web site offered by the assignee of the present invention).

The on-line service provider could provide services other than storing the digital images. For example, the on-line service provider might offer services such as providing reprints, tee shirt imprints, mouse pads, coffee mugs, business cards, greeting cards and postcards, The transaction machine may be situated at any location that is available to the public. For example, the transaction machine may be located in a hotel, restaurant, gift shop. It may be located in a kiosk.

The merchant might also own the remote site, or the remote site might be owned by another party. If the remote site is owned by another party, the merchant and the owner of the remote site might have a financial agreement. For example, the merchant and owner could share in the receipts for their combined services.

FIG. 3 shows an exemplary transaction machine 202 for the system 200 just described. The exemplary transaction machine, a mini-kiosk 202, includes a processor 300, memory 302, a network communications interface (e.g., a modem, a network interface card) 304, a printer 306, a credit card reader 308, a mini-keypad 310, a display 312 for user interface and a memory card reader 314. These components 300-314 may all be located in a single housing 316. The processor 300, network communications interface 304, printer 306, credit card reader 308, mini-keypad 310, display 312 and housing 316 may be of the type used in point-of-sale terminals (these terminals allow merchants to process credit, debit, check and electronic benefits transfer transactions efficiently at the point of sale). The memory card reader 314 can read standard types of removable camera memory.

The memory 302 is encoded with a program for instructing the processor 300 to prompt the customer or merchant to supply the digital images via the memory card reader 314 or other interface, provide other customer prompts on the display 312, determine and display the price for storing the digital images, process payment information received from the credit card reader 308 or mini keypad 310, command the printer 316 to print receipts, and send the paid-for digital images to the remote site via the network communications interface 304. The memory 302 could instruct the processor 300 to verify payment information over the Internet using a secure protocol.

If the printer 306 is an inkjet printer, the processor 300 can command the printer 306 to print thumbnails of paid-for images on the receipt. Printing the thumbnails and associated storage codes helps the customer identify the images that were stored at the remote site and allows the customer (and others) to quickly and easily download the images from the remote site.

Although the invention has been described in connection with a digital camera, it is not so limited. The invention may be applied to any device that stores digital images or other data. For example, the invention may be applied to a handheld scanner, a personal digital assistant (PDA), a handheld computer, etc.

The remote site is not limited to one that has a server, and uploading may be performed over a medium other than the Internet. The mode of delivery will depend upon the type of remote site. For example, a medium (e.g., magnetic tape, an optical disc) storing the digital images may be mailed to a service provider, who loads the images onto a personal computer, touches up the images and produces high-resolution prints of the touched-up images.

The transaction machine is not limited to a point-of-sale terminal. As one example, the transaction machine may be integrated with a public payphone that is equipped with a data port. As another example, the transaction machine might be a personal computer having a card reader, access to the Internet and access to a printer. The machine may include devices such as floppy drives, CD recorders and ZIP drives for storing the digital images onto media that can be delivered to remote sites.

The present invention is not limited to the specific embodiments described and illustrated above. Instead, the present invention is construed according to the claims that follow.

The invention claimed is:
1. A method comprising:
   transferring at least one digital image from a memory associated with a customer's digital camera imaging device to a memory at a remote site;
   displaying a price for storing the at least one digital image at the remote site;
   prompting a customer for payment of the price;

receiving a payment for storing the at least one digital image at the remote site;

storing the at least one digital image at the remote site; and printing a sales receipt including the price paid for storing the at least one digital image at the remote site, the date the payment was received and a thumbnail of the at least one digital image stored at the remote site.

2. The method of claim 1, further comprising uploading the at least one digital image to the remote site.

3. The method of claim 2, wherein the Internet is used to upload the at least one digital image.

4. The method of claim 2 wherein uploading the at least one digital image to the remote site further comprises storing the at least one digital image on a recordable medium.

5. The method of claim 4 wherein uploading the at least one digital image to the remote site further comprises mailing the recordable medium to the remote cite.

6. The method of claim 4 wherein the recordable medium is a CD ROM.

7. The method of claim 4 wherein the recordable medium is a tape.

8. The method of claim 1, further comprising receiving a plurality of digital images from the memory of the user's digital camera imaging device; and selecting the at least one digital image from a plurality of digital images.

9. The method of claim 8 wherein, selecting the at least one digital image from a plurality of digital images includes a user selecting at least one digital image from a plurality of digital images prior to submitting the at least one digital image to a transaction machine.

10. The method of claim 8 wherein, selecting the at least one digital image from a plurality of digital images further comprises:

displaying the plurality of digital images from memory of an imaging device; and prompting the selection of at least one digital image from the plurality of digital images.

11. The method of claim 10 wherein displaying the plurality of digital images from memory of an imaging device is performed on a transaction machine.

12. The method of claim 1, wherein transferring the at least one digital image includes reading memory That has been removed from the imaging device.

13. The method of claim 1, wherein the remote site is a server.

14. The method of claim 1, wherein the remote site is an image storage web site.

15. The method of claim 1, wherein the digital image is a picture image received from memory of a digital camera.

16. The method of claim 1, wherein transferring, displaying, prompting, receiving and printing are performed at a kiosk.

17. The method of claim 16, wherein the owner of the kiosk has a fee agreement with the owner of the remote storage site.

18. The method of claim 1 wherein the sales receipt further includes a listing of the at least one digital image.

19. The method of claim 18 wherein the sales receipt further includes a code for the at least one digital image.

20. A method of storing a digital image captured by a digital camera imaging device, the method comprising:

accessing at least one digital image from a memory from a digital camera imaging device with a transaction machine;

the transaction machine displaying a price for storing the at least one digital image at a remote site;

the transaction machine prompting a customer for payment of the price;

the transaction machine receiving a payment for storing the at least one digital image at the remote site;

storing the at least one digital image at the remote site; and confirming storage of the at least one digital image at the remote site with a sales receipt that includes the price paid for storing the at least one digital image at the remote site, the date the payment was received and information identifying the at least one digital image stored at the remote site.

21. The method of claim 20, further comprising printing the sales receipt and wherein the information identifying the at least one digital image stored at the remote site includes.

22. A system comprising:

means for transferring digital images from a customer's digital camera imaging device memory to a remote site;

means for storing the digital images at the remote site;

means for displaying a price for storing the digital images at the remote site;

means for prompting a customer for payment of the price;

means for receiving a payment for storing the digital images at the remote site; and means for printing a sales receipt including the price paid for storing the digital images at the remote site, the date the payment was received and information identifying the stored images.

23. The system of claim 22, wherein the information identifying the stored images comprises thumbnail images of the stored images.

24. The system of claim 22, further comprising means for prompting a user to select at least one of the digital images for storing from the received digital images.

25. The system of claim 22, further comprising the remote site.

26. A mini-kiosk comprising:

a memory card reader; and a processor responsive to the card reader and programmed to perform a point-of-sale financial transaction for sending digital images from a user's digital camera to a remote storage site, the processor confirming storage of digital images at the remote storage site in response to confirmation sent from the remote storage site, wherein the mini-kiosk is adapted for use by a plurality of customers.

27. The mini-kiosk of claim 26, further comprising a data communication device, responsive to the processor, for sending the digital images to the remote site.

28. The mini-kiosk of claim 26, further comprising at least one device, coupled to the processor, for entering payment information.

29. The mini-kiosk of claim 26, further comprising a receipt printer coupled to the processor; whereby the processor can command the printer to print out receipts of the transactions.

30. The mini-kiosk of claim 29, wherein the processor commands the printer to print receipts including thumbnails of paid-for images.

31. The mini-kiosk of claim 29, wherein the receipt printer coupled to the processor prints receipts that include thumbnails of the digital images stored as a result of the transaction.

32. An article for a transaction machine, the transaction machine adapted for use by a plurality of customers, the transaction machine having a processor and an interface, the article comprising:

computer memory linked to the processor, the interface communicatively coupled to the computer memory and the interface adapted to receive digital images from the plurality of customers; and a program encoded in the computer memory, the program, when executed, instructing the processor to receive digital images via the interface, determine a price for storing the digital images at a remote site, process payment information, send paid-for digital images to the remote site, and to receive confirmation of storage of the paid-for digital images from the remote site.

* * * * *

UNITED STATES PATENT AND TRADEMARK OFFICE
CERTIFICATE OF CORRECTION

| | | |
|---|---|---|
| PATENT NO. | : 7,680,692 B2 | Page 1 of 1 |
| APPLICATION NO. | : 09/785969 | |
| DATED | : March 16, 2010 | |
| INVENTOR(S) | : John F. Meyer et al. | |

It is certified that error appears in the above-identified patent and that said Letters Patent is hereby corrected as shown below:

In column 5, line 17, in Claim 5, delete "cite." and insert -- site. --, therefor.

In column 5, line 43, in Claim 12, delete "That" and insert -- that --, therefor.

In column 6, line 14, in Claim 21, delete "includes." and insert -- includes a thumbnail of the at least one digital image. --, therefor.

Signed and Sealed this

Thirtieth Day of November, 2010

David J. Kappos
*Director of the United States Patent and Trademark Office*